(12) United States Patent
Mueller et al.

(10) Patent No.: US 9,083,528 B2
(45) Date of Patent: Jul. 14, 2015

(54) AUTHENTICATION OF ENCRYPTED DATA BLOCKS

(75) Inventors: Thorsten Mueller, Unterschleissheim (DE); Stephan Eichler, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 15 days.

(21) Appl. No.: 13/981,028

(22) PCT Filed: Jan. 18, 2012

(86) PCT No.: PCT/EP2012/050671
§ 371 (c)(1),
(2), (4) Date: Jul. 22, 2013

(87) PCT Pub. No.: WO2012/098135
PCT Pub. Date: Jul. 26, 2012

(65) Prior Publication Data
US 2013/0301827 A1 Nov. 14, 2013

(30) Foreign Application Priority Data
Jan. 20, 2011 (DE) .......................... 10 2011 009 008

(51) Int. Cl.
*H04K 1/00* (2006.01)
*H04L 9/28* (2006.01)
*H04L 9/06* (2006.01)

(52) U.S. Cl.
CPC ................ *H04L 9/28* (2013.01); *H04L 9/0643* (2013.01)

(58) Field of Classification Search
CPC ...................................................... H04L 9/28
USPC ............................................................. 380/28
See application file for complete search history.

(56) References Cited

U.S. PATENT DOCUMENTS

| | | | |
|---|---|---|---|
| 7,415,109 B2 * | 8/2008 | Rose et al. | 380/37 |
| 7,627,121 B1 * | 12/2009 | Reeds et al. | 380/260 |
| 8,171,282 B2 * | 5/2012 | Amann et al. | 713/150 |
| 8,270,608 B2 * | 9/2012 | Reeds et al. | 380/260 |
| 8,340,280 B2 * | 12/2012 | Gueron et al. | 380/28 |
| 8,646,092 B2 * | 2/2014 | Gonzalvo et al. | 726/26 |
| 2004/0039908 A1 | 2/2004 | Rose et al. | |
| 2009/0310775 A1 | 12/2009 | Gueron et al. | |

FOREIGN PATENT DOCUMENTS

| | | |
|---|---|---|
| DE | 102008013785 A1 | 9/2008 |
| GB | 2442546 A | 4/2008 |
| WO | 2008104099 A1 | 9/2008 |

OTHER PUBLICATIONS

International Preliminary Report on Patentability for PCT/EP2012/050671 issued Jul. 23, 2013.
Hawkes, P. et al., "A Mode of Operation with Partial Encryption and Message Integrity (PEMI)," Internet Citation, Jun. 2002, pp. 1-8.
International Search Report for PCT/EP2012/050671 mailed Apr. 19, 2012.

* cited by examiner

*Primary Examiner* — Amare F Tabor
(74) *Attorney, Agent, or Firm* — Ditthavong & Steiner, P.C.

(57) ABSTRACT

An authentication-encryption unit provides at least one encryption element, where each encryption element encrypts a plain-data block and accordingly generates a cipher-data block. A common checksum is calculated over each cipher-data block. It is possible to select via a selection unit in each encryption element which data bits in each cipher-data block are to be used to calculate the common checksum.

26 Claims, 9 Drawing Sheets

AUTHENTICATION OF ENCRYPTED DATA BLOCKS

CROSS-REFERENCE TO RELATED APPLICATION

The present application is a national phase application of PCT Application No. PCT/EP2012/050671, filed on Jan. 18, 2012, and claims priority to German Application No. DE 10 2011 009 008.8, filed on Jan. 20, 2011, the entire contents of which are herein incorporated by reference.

BACKGROUND OF THE INVENTION

1. Field of the Invention

The invention relates to an authentication-encryption unit and an authentication-decryption unit and an associated method.

2. Discussion of the Background

An encrypted exchange of data via a common medium, such as the Internet, without the need to allow unauthorized access to the data to be transmitted (confidentiality protection) is of great importance. In addition to a sufficiently high level of encryption, it is also important that the integrity of the data transmitted is secured in order to guarantee that the data transmitted has not been altered on the transport route. An integrity protection of this kind is achieved, for example, by forming and also transmitting a checksum over the transmitted encrypted data.

A device and a method, with which a datastream is subdivided into individual blocks, wherein the individual blocks are encrypted and wherein a common checksum is calculated over the individual encrypted data blocks, are known from DE 10 2008 013 785 A1. A method known as the "Galois Counter Mode" and published by the National Institute of Standards and Technology (NIST) is used for this purpose. This published method is adopted in full into the present description through referencing.

The disadvantage with DE 10 2008 013 785 A1 is that it is not possible to remove individual encrypted data blocks or individual bits in the individual encrypted data blocks from the formation of a checksum. However, especially in the case of real-time applications, such as language transmissions, image transmissions or video transmissions, this is particularly desirable. If a transmission error occurs in the transmission of encrypted language, image or video data and, for example, one bit is transmitted incorrectly, this error is noticeable only marginally if at all through the absence of a checksum. If a checksum is calculated over the encrypted data blocks, the entire packet is rejected in the event of an incorrect transmission of one bit; this is associated with considerable disadvantages, especially in the case of the above named real-time applications, and has very disturbing effects. The user's "Quality of Experience" is reduced.

SUMMARY OF THE INVENTION

Embodiments of the invention advantageously provide an authentication-encryption unit and an authentication-decryption unit and an associated method, with which it is possible to remove encrypted data blocks or respectively individual bits in the encrypted data blocks from the formation of a checksum, wherein a fast execution rate and efficiency must be ensured at the same time.

The authentication-encryption unit provides at least one encryption element. Each encryption element encrypts a plain-data block and accordingly generates a cipher-data block, wherein a common checksum is calculated over each cipher-data block. Via a selection unit in each encryption element, it is possible to select which data bits in each cipher-data block are to be used to calculate the common checksum.

The authentication-decryption unit also provides at least one decryption element. Each decryption element decrypts a cipher-data block and accordingly generates a plain-data block, wherein a common checksum is calculated over each cipher-data block. Via a selection unit in each decryption element, it is possible to select which data bits in each cipher-data block are to be used to calculate the common checksum.

It is particularly advantageous with the authentication-encryption unit and with the authentication-decryption unit that data bits in each cipher-data block which are to be used to calculate the common checksum can be selected. Accordingly, it is possible that only control data in the cipher-data blocks are used to calculate a checksum and that no checksum is formed over the payload data themselves, which contain, for example language, image or video data.

The method for an authentication-encryption unit, which provides at least one encryption element, comprises several method steps. In a first method step, a plain-data block is encrypted in each encryption element, so that a cipher-data block is generated from this. In a further method step, a selection unit in each encryption element selects which data bits in each cipher-data block are to be used to calculate the common checksum, so that a common checksum is then calculated over each cipher-data block.

The method for an authentication-decryption unit, which provides at least one decryption element, comprises the following method steps. In a first method step, a cipher-data block is decrypted in each decryption element, so that a plain-data block is generated from this. In a further method step, a selection unit in each decryption element selects which data bits in each cipher block are to be used to calculate the common checksum, so that the common checksum is then calculated over each cipher-data block.

In the method for the authentication-encryption unit and in the method for the authentication-decryption unit, it is particularly advantageous that it is possible to select, via a selection unit in each encryption element or decryption element, which data bits are to be used in each cipher-data block to calculate the common checksum. Accordingly, it can be ensured that, for example, by contrast with control data, payload data can be excluded from the formation of a common checksum. In the remainder of this document, control data refer to the header information (header data), which is used for the transmission of the payload data in the various transmission protocols—independently of whether this information is transmitted together with the payload data in a packet, or separately in a dedicated channel.

A further advantage of the authentication-encryption unit or of the authentication-decryption unit is achieved if the selection unit in each encryption element or decryption element links a freely selectable bit mask via a logical AND to the cipher-data block of the encryption element or decryption element. Such a freely selectable bit mask and a linking with a logical AND can be realized very simply in a programmable logic module, such as an FGPA (field programmable gate array).

A further advantage of the authentication-encryption unit or the authentication-decryption unit is achieved if a first logical status at a position in the bit mask is set when the corresponding bit at the same position in the cipher-data block is to be used to calculate the common checksum and/or if a second logical status at a position in the bit mask is set when the corresponding bit at the same position in the cipher-data block is not be used to calculate the common checksum. The first logical status is, for example, a logical "one", whereas, the second logical status is a logical "zero". Accordingly, it is possible for payload data and control data to be encrypted jointly in one cipher-data block, because it is guaranteed that only the control data can be used for the formation of a common checksum, thereby achieving a very efficient coding.

Additionally, an advantage of the method for an authentication-encryption unit or an authentication-decryption unit is achieved if the authentication-encryption unit or the authentication-decryption unit in the method operates according to the principle of the Galois Counter Mode, because no security gaps have hitherto been demonstrated with the Galois Counter Mode, and this operates very rapidly and can be implemented at reasonable cost in both software and hardware.

Moreover, an advantage of the method for an authentication-encryption unit or an authentication-decryption unit is achieved if the bit masks can be adjusted arbitrarily and independently of one another in the selection unit of each encryption element. This means that no special conditions with regard to the number and arrangement of payload data and control data need to be present.

Finally, it is advantageous in the method for an authentication-encryption unit or an authentication-decryption unit if more data bits in the cipher-data block are selected by the selection unit for the calculation of the checksum when a transmission of the cipher-data blocks provides few transmission errors and/or if less data bits in the cipher-data block are selected by the selection unit for the calculation of the checksum when a transmission of the cipher-data blocks provides more transmission errors. This ensures that the additional integrity protection is only dispensed with if the properties of the transmission path do not allow otherwise.

Within the description, the authentication-encryption unit and the authentication-decryption unit are described only in interaction with the Galois Counter Mode. However, in principle, embodiments of the present invention can be used with all encryption types in which the encryption is implemented block-wise and in which integrity is to be protected.

BRIEF DESCRIPTION OF THE DRAWINGS

Various exemplary embodiments of the invention are described by way of example below with reference to the drawings. The same subject matters provide the same reference numbers. In detail, the corresponding figures in the drawings are as follows.

DETAILED DESCRIPTION OF EXEMPLARY EMBODIMENTS OF THE INVENTION

Figure 1:
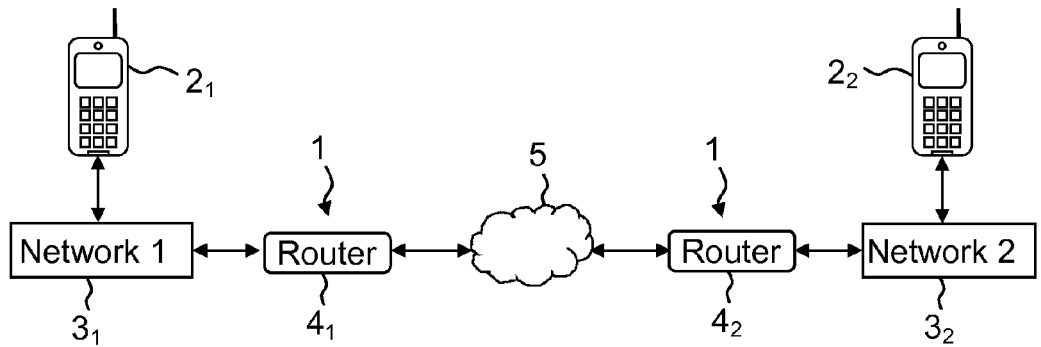
FIG. 1 shows an exemplary embodiment which describes an application for a computational unit.

FIG. 1 describes an application for the computational unit 1 with the integrated authentication-encryption unit 6 according to an embodiment of the invention and the integrated authentication-decryption unit 7 according to an embodiment of the invention. Two mobile terminals $2_1$, $2_2$, which are illustrated in the exemplary embodiment from FIG. 1 as mobile telephones, exchange data packets 8 with one another after a language connection has been set up. The data packets 8 to be exchanged in this exemplary embodiment are IP data packets (Internet protocol). The mobile terminal devices $2_1$, $2_2$ in this exemplary embodiment are connected to the network $3_1$ or respectively to the network $3_2$. The network $3_1$ is connected to the router $4_1$, and the network $3_2$ is connected to the router $4_2$. Both routers $4_1$ and $4_2$ are connected to one another via a radio transmission 5 through air. Interference can very frequently be superposed over such a radio transmission 5.

In this context, both routers $4_1$ and $4_2$ establish a VPN connection (virtual private network). This VPN network, which both routers $4_1$ and $4_2$ establish with one another is based, for example, an IPSEC (Internet protocol security) and connects the networks $3_1$ and $3_2$ to one another. The computational unit 1 according to the invention with an authentication-encryption unit 6 or an authentication-decryption unit 7 in the exemplary embodiment from FIG. 1 is preferably embodied in the routers $4_2$ and $4_2$, which, in this context, are preferably integrated in the mobile terminal devices $2_2$, $2_2$. The computational unit 1 according to the invention can also be embodied in routers $4_2$ and $4_2$, which are not realized in the mobile terminal devices $2_2$, $2_2$ and, for example, which connect the two networks $3_2$, $3_2$ to one another via the Internet.

Figure 2A:
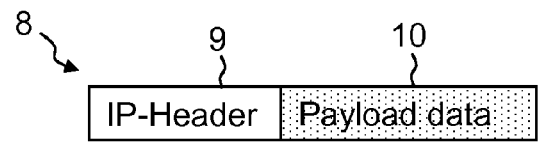
FIG. 2A shows an exemplary embodiment of a data packet such as can be transmitted, for example, by mobile terminal devices.

FIG. 2A shows an exemplary embodiment of a data packet 8, which is exchanged between the mobile terminal devices $2_2$ and $2_2$. The data packet 8 in this exemplary embodiment is an IP data packet. The data packet 8 provides a region in which an IP header 9 is disposed, and a region in which the payload data 10 are disposed. In the case that the data packet 8 from FIG. 2A is transmitted from the mobile terminal device $2_2$ to the mobile terminal device $2_2$, for example, the information about the target address in the network $3_2$, which can also be referred to as control data, is disposed in the IP header 9.

Figure 2B:
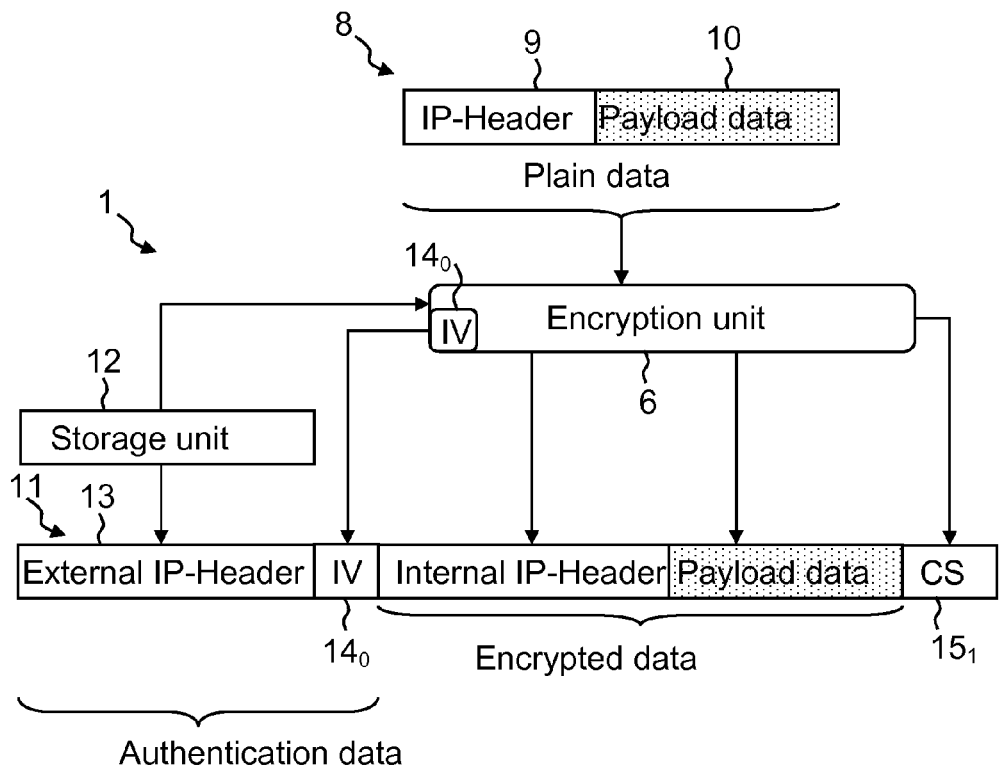
FIG. 2B shows an exemplary embodiment of how the computational unit further processes the data packet from the mobile terminal device.

FIG. 2B shows an exemplary embodiment of a computational unit 1 with an integrated authentication-encryption unit 6 according to the invention. The computational unit 1 in the exemplary embodiment from FIG. 2B is integrated in the routers $4_2$ and respectively $4_2$. In the case that the mobile terminal device $2_2$ transmits a data packet 8 to the mobile terminal device $2_2$, the data packet 8, which comprises a region with an IP header 9 and a region with the payload data 10, is transferred to the authentication-encryption unit 6 according to the invention. The computational unit 1 then generates a new IP data packet 11, which can be transmitted via a common medium, such as the Internet 5 and transports the encrypted data packet 8 in its payload-data region.

For this purpose, the computational unit 1 reads out the public IP address of the router $4_2$, in which the target network $3_2$ is disposed, from a memory unit 12. This IP address from the public address domain is entered as the target address in an external IP header 13. This target address is also communicated to the authentication-encryption unit 6, and, as will be explained in greater detail below, preferably used within the latter as authentication data 13. By preference, the initialization vector $14_0$ is also a component of the authentication data 13. The authentication-encryption unit 6 also generates a start value for an initialization vector $14_0$. This start value for the initialization vector $14_0$ is added to the payload-data region of the IP data packet 11 and is not encrypted. The IP header 9 and the payload data 10 from the data packet 8 are encrypted by the authentication-encryption unit 6 and transferred to the payload-data region of the IP data packet 11. Furthermore, the authentication-encryption unit 6 generates a checksum $15_1$, which is also transferred to the payload-data region of the IP data packet 11. As will be explained below, the checksum $15_1$ can be calculated from the encrypted data or from parts of the encrypted data.

As will be described in greater detail below, the router $4_2$ receives and decrypts the IP data packet 11 and routes the content, comprising the encrypted payload data, the start value of the initialization vector $14_0$ and the checksum $15_1$, to the authentication-decryption unit 7, which decrypts the encrypted data, so that these can then be rerouted to the mobile terminal device $2_2$.

Figure 3:
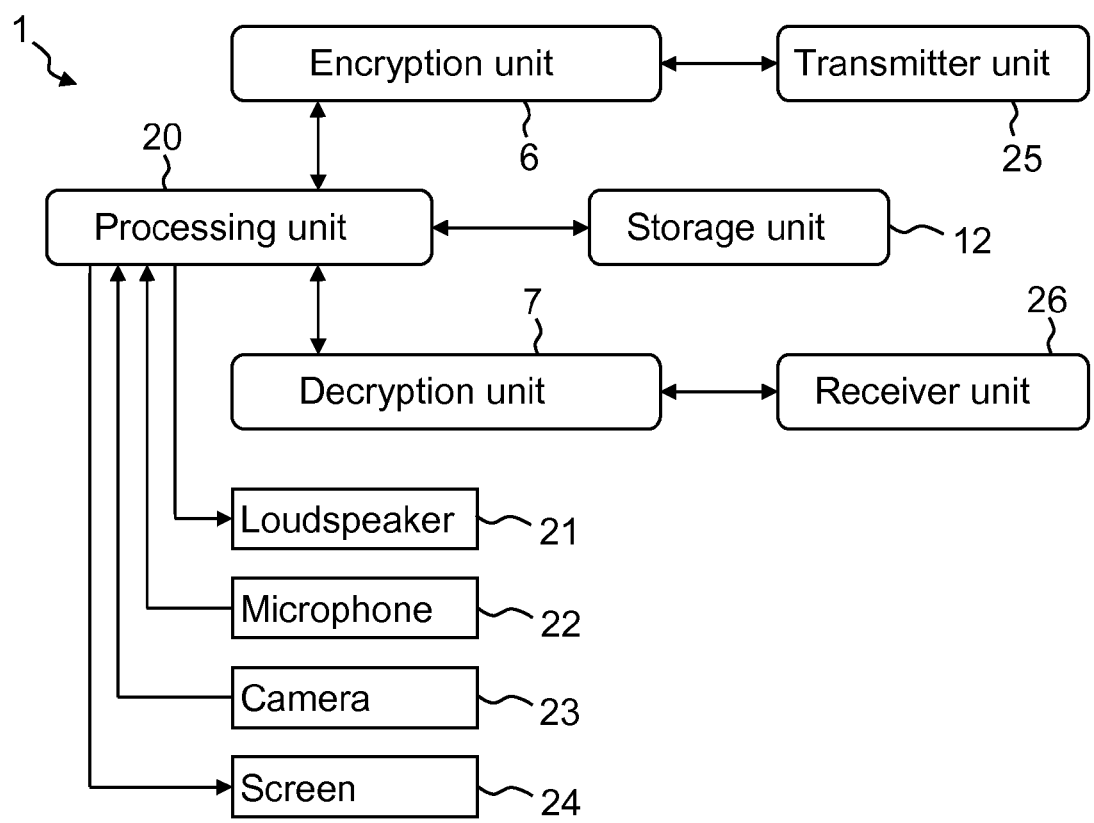
FIG. 3 shows an overview of an exemplary embodiment of the computational unit with the integrated authentication-encryption unit according to the invention and the integrated authentication-decryption unit according to the invention.

FIG. 3 shows an exemplary embodiment of the computational unit 1 with the integrated authentication-encryption unit 6 according to the invention and the integrated authentication-decryption unit 7 according to the invention. The core of the computational unit 1 is the central data-processing unit 20. This central data-processing unit 20 can be, for example, a signal processor or a programmable logic module. The central data-processing unit 20 is connected both to the authentication-encryption unit 6 and also to the authentication-decryption unit 7. The memory unit 12 is also connected to the central processing unit 20.

In the exemplary embodiment according to the invention from FIG. 3, at least one loudspeaker 21, at least one microphone 22, at least one camera system 23 and at least one screen unit 24 are connected to the central data-processing unit 20. However, all four of the systems 21, 22, 23, 24 need not be connected to the central data-processing unit 20; only one or more of these systems 21, 22, 23, 24 may be connected to the central data-processing unit 20. The central data-processing unit 20 receives a datastream from the at least one microphone 22 or the at least one camera system 23 and optionally encrypts the latter before the datastream is routed to the authentication-encryption unit 6. At the other end, the central data-processing unit receives a datastream from the authentication-decryption unit 7 and optionally decrypts the latter before it is routed to the at least one loudspeaker 21 or to the at least one screen unit 24.

The authentication-encryption unit 6 in the exemplary embodiment from FIG. 3 is connected to the transmitter unit 25. The authentication-decryption unit 7 in the exemplary embodiment from FIG. 3 is connected to the receiver unit 26. According to the exemplary embodiment from FIG. 1, the transmitter unit 25 and the receiver unit 26 can be a wirebound (data-) transmission path, for example, a network connection. However, it is also possible for the transmitter unit 25 and the receiver unit 26 to be a communication unit, which allows wireless data transmission. In this case, the transmitter unit 25 contains the necessary conditioning and amplifier elements, wherein the receiver unit 26 contains the corresponding mixer arrangements for the reception of a datastream transmitted through air in the frequency bands possible for this purpose, such as HF (high-frequency), VHF (very high-frequency) or UHF (ultra-high-frequency) and devices for the digitization of the baseband signal. Transmission errors then occur, for example, because of a poor transmission channel.

Figure 4A:
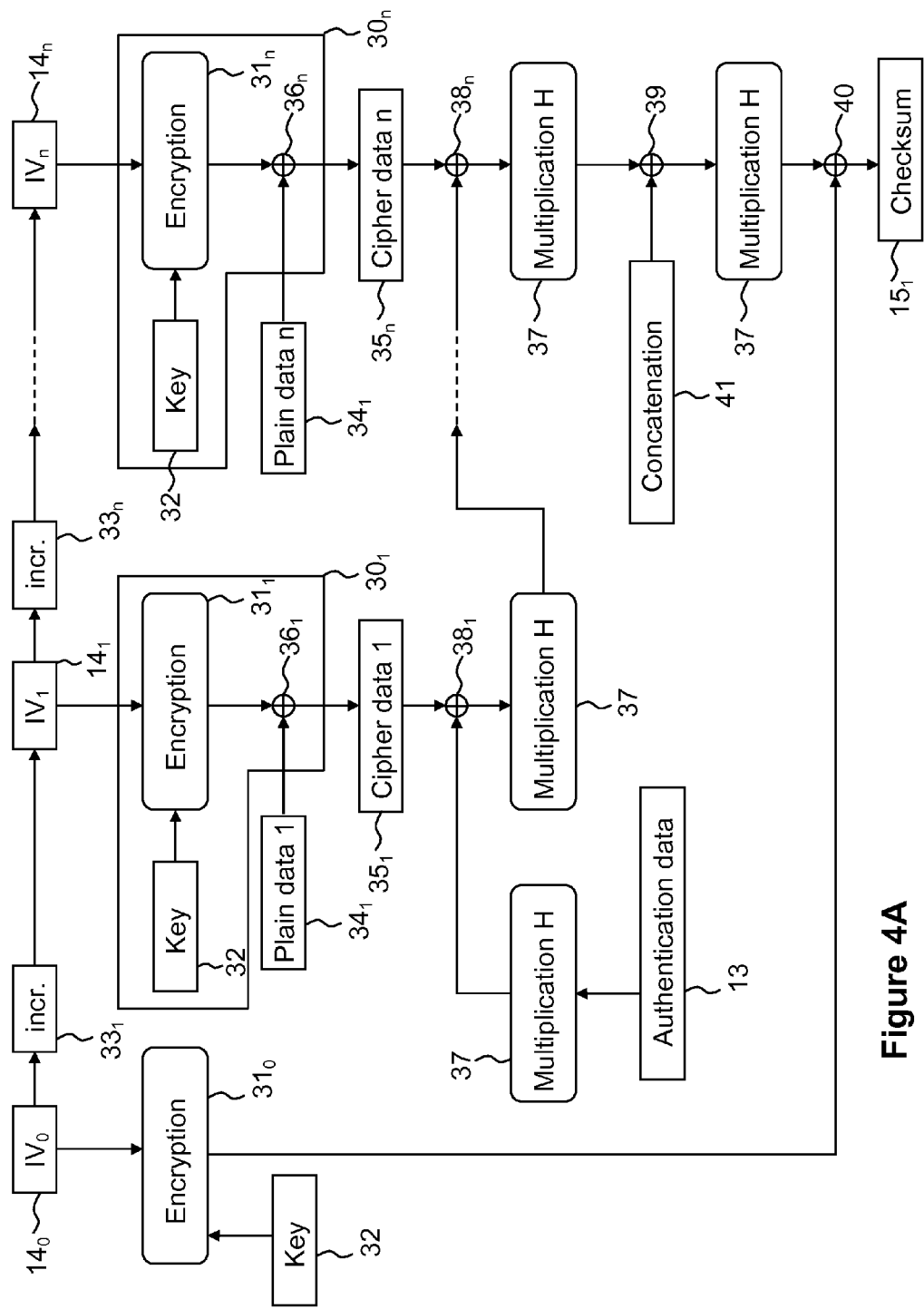
FIG. 4A shows an exemplary embodiment of an authentication-encryption unit previously used internally.

FIG. 4A shows a known exemplary embodiment which describes the functioning of an authentication-encryption unit which operates according to the principle of the Galois Counter Mode. The known authentication-encryption unit provides n encryption elements $30_1$ to $30_n$, where n≥1, wherein at least one encryption element $30_1$ is necessary for the functioning of the authentication-encryption unit. In this context, each encryption element $30_1$ to $30_n$ provides an encryption unit $31_1$ to $31_n$, wherein each encryption unit $31_1$ to $31_n$ is preferably supplied with the same key 32. This key 32 is stored, for example, in the storage unit 12. Furthermore, each encryption element $30_1$ to $30_n$ provides an XOR-link $36_1$ to $36_n$.

An initialization vector $14_0$, which can provide a value from 0 to $2^{64}-1$ is incremented by one in each case by an incrementation unit $33_1$ to $33_n$ upstream of each encryption element $30_1$ to $30_n$, so that the value of the initialization vector $14_0$ incremented by one by the incrementation unit $33_1$ is supplied to the encryption element $30_1$. This value of the initialization vector $14_0$ incremented by one is designated by the first encryption element $30_1$ as the initialization vector $14_1$. As a result of the fact that the initialization vector $14_0$ is incremented by the value of one for every encryption element $31_1$ to $31_n$, there are a total of n+1 initialization vectors $14_0$, $14_1$ to $14_n$. The initialization vector $14_0$ is also stored in the IP data packet 11 and not encrypted. The initialization vectors $14_1$ to $14_n$ are encrypted by the encryption units $31_1$ to $31_n$ within the encryption elements $30_1$ to $30_n$ with the key 32. The initialization vector $14_0$ must be selected in such a manner that the value is not repeated even after n incrementation units $33_1$ to $33_n$. The individual incrementation units $33_1$ to $33_n$ are realized, for example, by a counter, which is efficiently realized in hardware. The start value of this counter or also the initialization vector $14_0$ in this context is selected randomly, but it must be ensured that the counter does not overflow. An AES encryption (Advanced Encryption Standard) with a block size of 128 bits and a key length of 256 bits is preferably taken as the encryption algorithm, wherein all other block ciphers can also be used. Such an AES encryption can also encrypt blocks with 128 bits each.

An XOR-link $36_1$ to $36_n$, which is connected in each case to the corresponding encryption unit $31_1$ to $31_n$, is disposed within each encryption element $30_1$ to $30_n$. A second input of this XOR-link $36_1$ to $36_n$ is linked to the corresponding plain-data block $34_1$ to $34_n$ to be encrypted. Accordingly, precisely one plain-data block $34_1$ to $34_n$ within precisely one encryption element $30_1$ to $30_n$ is XOR-linked to the output value of precisely one encryption unit $31_1$ to $31_n$. In the case of a 128-bit AES encryption, the initialization vectors $14_0$ to $14_n$ must provide a block size of 128 bits or less, wherein the difference between the actual size of the initialization vectors $14_0$ to $14_n$ and the 128 bits must be padded (padding). By preference, the initialization vector $14_0$ is always 128 bits long, so that the padding can be dispensed with.

The processing unit 20 from FIG. 3, which is implemented within the computational unit 1, splits the data packet 8 into blocks 128 bits long. Dependent upon the size of the MTU value (Maximum Transmission Unit) which varies dependent upon the transmission medium (Ethernet, Gigabit-Ethernet, Fibre Channel, etc.), a sufficient number of encryption elements $31_1$ to $31_n$ must be realized one after the other, so that the maximal data-packet size specified by the MTU value is split up into correspondingly small sizes capable of being handled by the encryption units $31_1$ to $31_n$. A typical MTU size for Ethernet is 1500 bytes, so that the data packet 8 may be a maximum of 1500 bytes long. If an AES-256 encryption is used within the encryption units $31_1$ to $31_n$, at least 1500× 8/128 encryption elements $30_1$ to $30_n$ must be realized, wherein the result is rounded up. For the case named above, the number of encryption elements in the case of Ethernet with an MTU value of 1500 is rounded to 94. The use of other encryption types is, of course, also conceivable.

At the output of the encryption elements $30_1$ to $30_n$, the encrypted plain-data blocks $34_1$ to $34_n$ are output as cipher-data blocks $35_1$ to $35_n$. On the basis of the XOR-link $36_1$ to $36_n$, it is ensured that the bit sequence within the plain-data blocks $34_1$ to $34_n$ also corresponds to the bit sequence in the cipher blocks $35_1$ to $35_n$. An item of information which is disposed in the plain-data blocks $34_1$ to $34_n$ at a quite definite bit position, for example, within the 128 bits, can therefore also be found in the same position in the cipher-data blocks $35_1$ to $35_n$. Following this, the various cipher-data blocks $35_1$ to $35_n$ are inserted by the processing unit 20 into the payload-data region of the IP data packet 11. In this case, it should be taken into account that the length of the cipher-data blocks $35_1$ to $35_n$ is shorter than the permitted MTU value, because an external IP header 13 must be built up around the payload-data region in the IP data packet 11.

In a next step, after the plain-data blocks $34_1$ to $34_n$ have been encrypted by the encryption elements $30_1$ to $30_n$, thereby generating the cipher-data blocks $35_1$ to $35_n$, a checksum $15_1$ is formed over all cipher-data blocks $35_1$ to $35_n$. For this purpose, known authentication data 13 are multiplied in the multiplication unit 37 by the Galois field vector H, wherein the result is linked with an XOR-link $38_1$ to the cipher-data block $35_1$. In this context, the structure of the Galois field vector H is described in the publication "Galois/Counter Mode of Operation", to which reference is hereby made. The result of this XOR-link $38_1$ is multiplied in a multiplication unit 37 by the Galois field vector H and then linked by the next XOR-link $38_2$ to the next cipher-data block $35_2$, which is not illustrated in the figures of the drawings for reasons of visual clarity.

This occurs until the last cipher-data block $35_n$ has been linked via the last XOR-link $38_n$. The result of the last XOR-link $38_n$ is multiplied in a multiplication unit 37 by the Galois field vector H and then linked by the XOR-link unit 39 to the result of a concatenation 41 made up from a bit length of the authentication data 13 and a bit length of the cipher-data block 35. A concatenation 41 of the bits 001 and 10111 results in the bit sequence 00110111. In this context, concatenation is therefore understood to mean the fitting together of bit sequences to form an overall bit sequence.

The result of the XOR-link unit 39 is multiplied in the multiplication unit 37 by the Galois field vector H. This result is supplied to the XOR-link unit 40 and linked to the initial vector $14_0$ encrypted by the coding unit $31_0$ with the key 32. The XOR-link unit 40 supplies the checksum $15_1$ as the result.

The advantage of the authentication-encryption unit previously used internally by the applicant, which operates according to FIG. 4A, is that the encryption elements $30_1$ to $30_n$ operate in an approximately parallel manner, and also the generation of the checksum $15_1$ over the individual cipher-data blocks $35_1$ to $35_n$ can be integrated very readily into this concept.

If the authentication-encryption unit 6 from FIG. 2B is structured corresponding to the circuit diagram from FIG. 4A, the superordinate computational unit 1 would integrate the checksum $15_1$ into the payload-data region of the IP data packet 11. The IP data packet would be transmitted to the receiver via the transmitter unit 25 connected to the authentication-encryption unit 6.

Figure 4B:
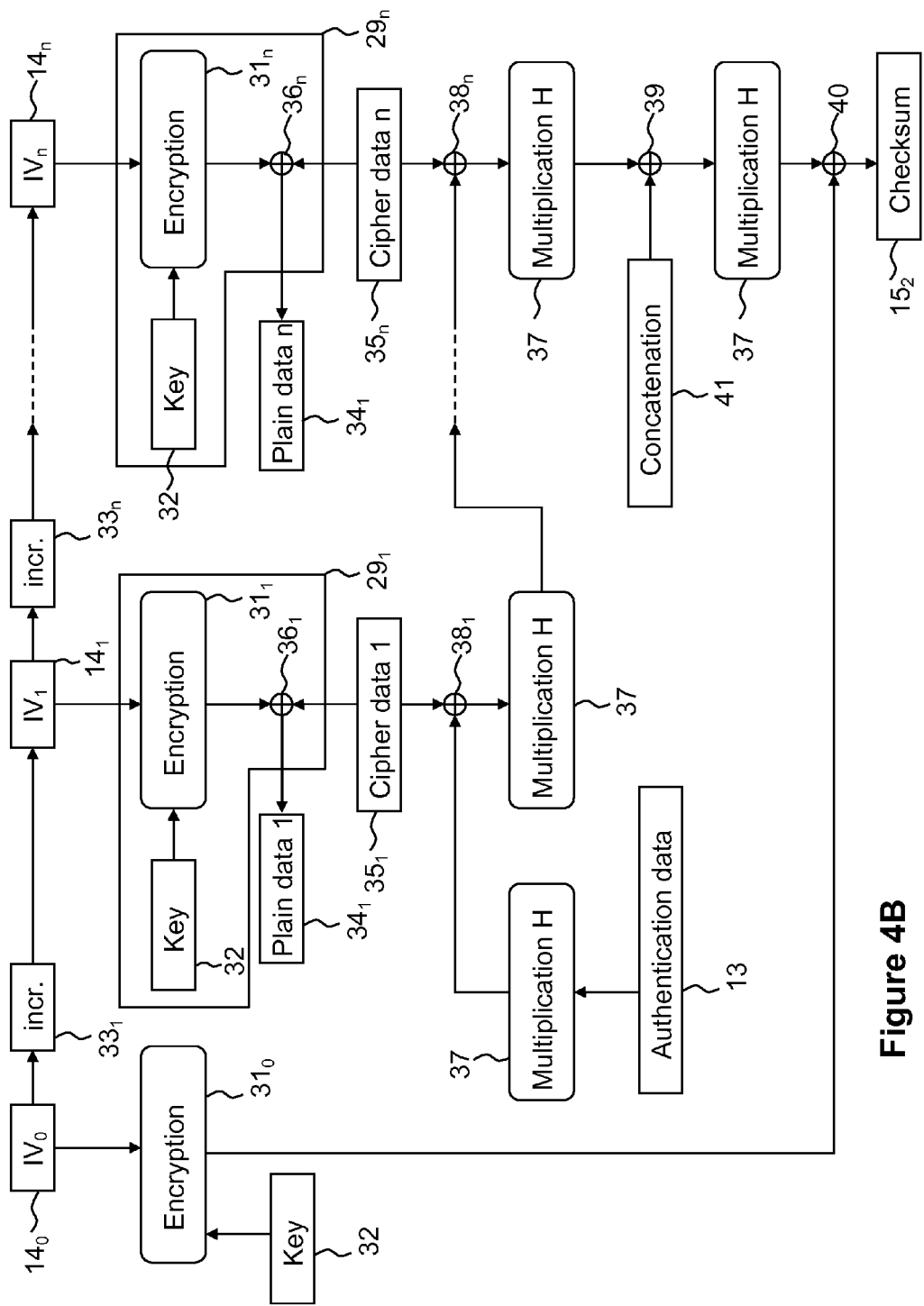
FIG. 4B shows an exemplary embodiment of an authentication-decryption unit previously used internally.

To provide a complete overview, FIG. 4B presents an overview circuit diagram of an authentication-decryption unit 7 previously used internally by the applicant, which operates according to the principle of the Galois Counter Mode. The manner of functioning of the authentication-decryption unit from FIG. 4B is substantially identical to the authentication-encryption unit from FIG. 4A, for which reason reference is made here to the description for FIG. 4A.

The difference between the authentication-encryption unit from FIG. 4A and the authentication-decryption unit from FIG. 4B is that in FIG. 4B, the XOR-link units $36_1$ to $36_n$ link the output of the encryption units $31_1$ to $31_n$ to the received cipher-data blocks $35_1$ to $35_n$, so that the plain-data blocks $34_1$ to $34_n$ are present at the output of the XOR-link units $36_1$ to $36_n$. In this case, the encryption elements $30_1$ to $30_n$ are the decryption elements $29_1$ to $29_n$, wherein the decryption elements $29_1$ to $29_n$ encrypt an initialization vector $14_1$ to $14_n$ with the key 32 in the encryption units $31_1$ to $31_n$. Only the output of the encryption units $31_1$ to $31_n$ within the decryption elements $29_1$ to $29_n$ is used together with the XOR-link units $36_1$ to $36_n$ and the cipher-data blocks $35_1$ to $35_n$ in order to generate the plain-data blocks $34_1$ to $34_n$.

The initialization vector $14_0$ is communicated to the authentication-decryption unit via the IP data packet 11. The authentication data 13 which preferably comprise the control data (IP header) are also known to the authentication-decryption unit from the IP data packet 11. According to the procedure explained with reference to FIG. 4A, the authentication-decryption unit also calculates a checksum $15_2$, by using the cipher-data blocks $35_1$ to $35_n$ and the authentication data 13 for this purpose. As soon as the authentication-decryption unit has calculated the checksum $15_2$, the calculated checksum $15_2$ is compared with the checksum $15_1$, which the authentication-decryption unit has received in the IP data packet 11. If the two checksums $15_1$, $15_2$ agree, it is very probable that the ciphers $35_1$ to $35_n$ are also the ciphers $35_1$ to $35_n$, which were generated by the authentication-encryption unit.

Figure 5A:
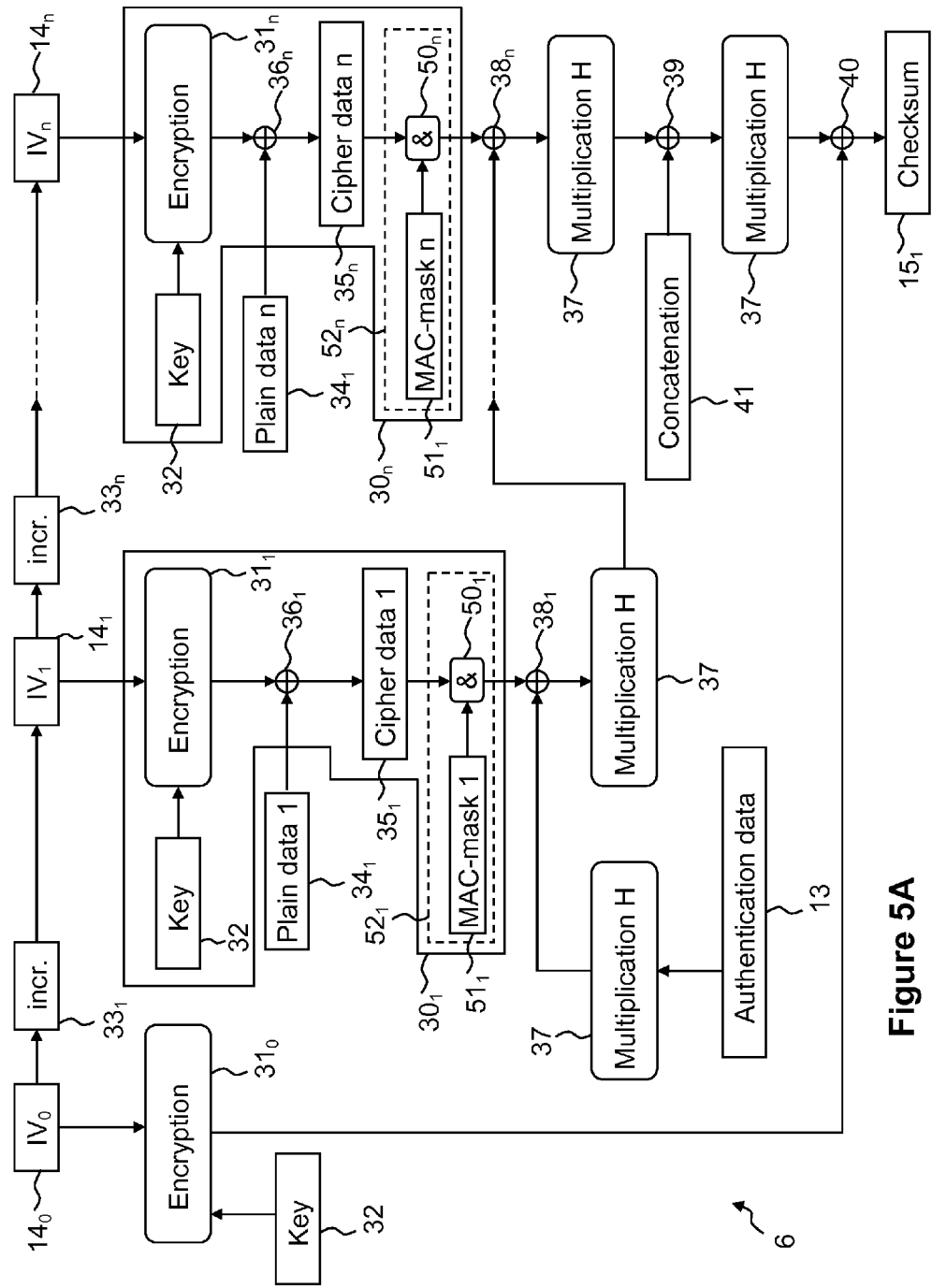
FIG. 5A shows an exemplary embodiment of an authentication-encryption unit according to the invention.

FIG. 5A shows an exemplary embodiment of the authentication-encryption unit 6 according to the invention which is integrated within a computational unit 1. The authentication-encryption unit 6 according to the invention is based on the principles of the Galois Counter Mode, as already explained in detail in the description for the preceding FIGS. 4A and 4B. For this reason, with identical reference numbers, reference is therefore made to the descriptions for FIGS. 4A and 4B.

By contrast, each encryption unit $30_1$ to $30_n$ still provides a selection unit $52_1$ to $52_n$, by means of which it is possible to select which data bits within each cipher-data block $35_1$ to $35_n$ are to be used to calculate the common checksum $15_1$. For this purpose, within each encryption element $30_1$ to $30_n$, the selection unit $52_1$ to $52_n$ links a freely selectable bit mask $51_1$ to $51_n$ via a logical AND $50_1$ to $50_n$ to the cipher-data blocks $35_1$ to $35_n$ of the individual encryption elements $30_1$ to $30_n$. The bit mask $51_1$ to $51_n$ is also referred to as a MAC-mask (message authentication code). If a first bit sequence 0101 is linked to a second bit sequence 0011 by means of a logical AND link, the result is the bit sequence 0001. The freely selectable bit mask $51_1$ to $51_n$ preferably provides the same bit length as the cipher-data blocks $35_1$ to $35_n$. In each case, one logical AND $50_1$ to $50_n$ and one bit mask $51_1$ to $51_n$ are integrated in a selection unit $51_1$ to $51_n$.

As soon as a first logical status, which can be a logical "one", is set within a position within the bit mask $51_1$ to $51_n$, the corresponding bit at the same position within the cipher-data block $35_1$ to $35_n$ is used to calculate the common checksum $15_1$. In a complementary manner, in the case of a second logical status, which can be a logical "zero" and is set at a position within the bit mask $51_1$ to $51_n$, the corresponding bit at the same position within the cipher-data block $35_1$ to $35_n$ is not used to calculate the common checksum $15_1$. This means that the plain-data block $34_1$ to $34_n$ and accordingly a cipher-data block $35_1$ to $35_n$ contains both payload data 10 and also control data 9, wherein a checksum $15_1$ is to be provided especially only for the control data 9. Accordingly, the data blocks 8 to be used within the authentication-encryption unit 6 according to the invention can be subdivided in a very efficient manner. The fact that the basic method of operation of the "Galois Counter Mode" is not changed and also that an efficient realization in software or hardware can be implemented is also particularly significant.

The individual bit masks $51_1$ to $51_n$ of the selection units $52_1$ to $52_n$ within the each encryption element $30_1$ to $30_n$ can be adjusted arbitrarily and completely independently of one another in this context. Only at the end with the authentication-decryption unit 7, the same bit masks $51_1$ to $51_n$ must be used in the decryption elements $29_1$ to $29_n$. By preference, precisely those data bits within the cipher-data block $35_1$ to $35_n$ which already contain an error protection are removed by the selection unit $52_1$ to $52_n$ from the calculation of the common checksum $15_1$. Such an error protection exists, for example, in the transmission of video, image or language data, because the information at the receiver end enters a robust decryption unit, or respectively, CRC (cyclic redundancy check) is present. Following this, a single bit error would not be perceptible to the human hearing, or it could hardly be perceived if at all on a screen unit 24. By contrast, the matter is different if the entire payload data 10 within the IP data packet 11 are rejected because of an inconsistent checksum $15_1$, $15_2$, so that a time of, for example, 20 ms would be missing at the receiver end, dependent upon MTU value and bit rate.

For the reasons named, it is therefore meaningful for the authentication-encryption unit 6 according to the invention and also the authentication-decryption unit 7 according to the invention to operate according to the principle of the Galois Counter Mode.

In this context, the advantage is that, within each encryption element $30_1$ to $30_n$, an encryption unit $31_1$ to $31_n$ always encrypts another initialization vector $14_1$ to $14_n$ with the same key, so that even identical plain-data blocks $34_1$ to $34_n$, which are linked to the result from the encryption units $31_1$ to $31_n$ via an XOR-link $36_1$ to $36_n$, lead to different cipher-data blocks $35_1$ to $35_n$.

The result of the first selection unit $52_1$ is linked via the XOR-link unit $38_1$ to the result of a multiplication unit 37, which multiplies authentication data 13 by the Galois field vector H. The further selection units $52_2$ to $52_n$ are each connected via a multiplication unit 37 to the output of the preceding XOR-link unit $38_1$ to $38_{n-1}$ via the XOR-link unit $38_2$ to $38_n$. The calculation of the checksum $15_1$ is implemented in FIG. 5A by analogy with the deliberations relating to FIG. 4A, to which reference is made here.

Figure 5B:
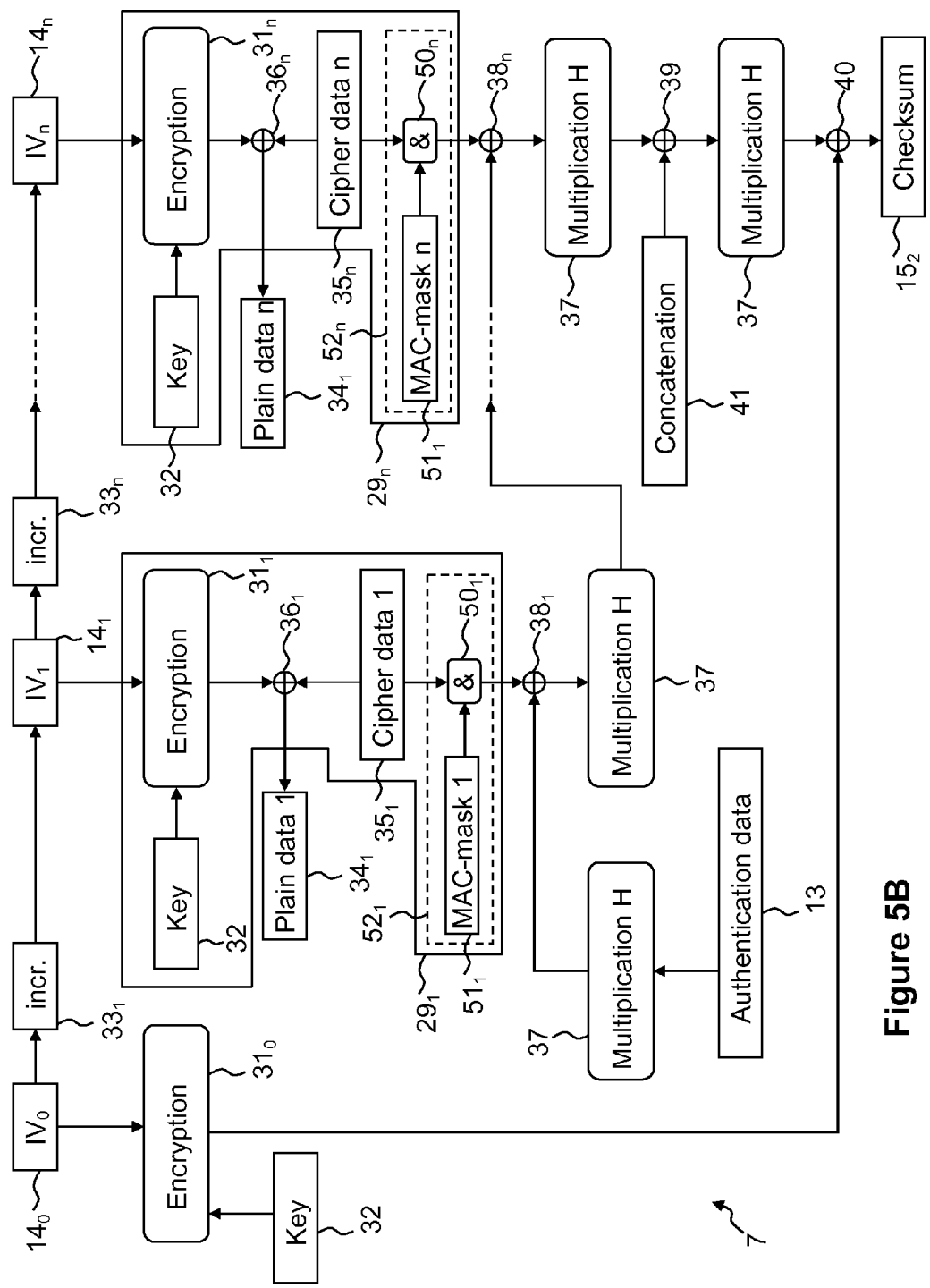
FIG. 5B shows an exemplary embodiment of an authentication-decryption unit according to the invention.

FIG. 5B shows an exemplary embodiment of an authentication-decryption unit 7 according to the invention, which is preferably integrated in a computational unit 1. The difference from the exemplary embodiment according to the invention from FIG. 5A is that the encryption elements $30_1$ to $30_n$ are now the decryption elements $29_1$ to $29_n$, wherein the XOR-link units $36_1$ to $36_n$ link the result of the encryption units $31_1$ to $31_n$ to the cipher-data blocks $35_1$ to $35_n$, so that, the plain-data blocks $34_1$ to $34_n$ are present at the output of the XOR-link units $36_1$ to $36_n$. Overall, each authentication-decryption unit 7 provides at least one decryption element $29_1$ to $29_n$, wherein each decryption element $29_1$ to $29_n$ decrypts a cipher-data block $35_1$ to $35_n$ and, in this context, generates a plain-data block $34_1$ to $34_n$.

The bit masks $51_1$ to $51_n$ applied by the authentication-decryption unit 7 in the selection unit $52_1$ to $52_n$ must be identical to the bit masks $51_1$ to $51_n$ applied in the authentication-encryption unit 6 in the selection units $52_1$ to $52_n$. The bit mask $51_1$ to $51_n$ to be used can also be specified in the external IP header 13. For example, three bits can be provided for this purpose in order to display eight different bit masks $51_1$ to $51_n$.

Following this, the checksum $15_2$ is calculated in the authentication-decryption unit 7 according to the invention on the basis of the known authentication data 13 and the known cipher-data blocks $35_1$ to $35_n$ and the known bit masks $51_1$ to $51_n$. Regarding the manner according to which the checksum $15_2$ is calculated, reference is made to the description for the drawings in FIGS. 5A and 4A. If the checksum $15_2$ calculated by the authentication-decryption unit 7 does not agree with the checksum $15_1$, which was received in the IP data packet 11, all of the control data and payload data, of which the integrity could not be verified, is rejected. Received data, which have not been used for the calculation of the checksum $15_2$ are further processed in a normal manner after their decryption. This means that transmission errors which can occur, for example, across an air interface, do not lead to the rejection of the entire IP data packet 11, with video data and/or language data and/or image data within the payload-data region, in the case of a single bit error.

The bit masks $51_1$ to $51_n$ can be matched dependent upon the quality of the connection between the mobile terminal devices $2_1$ and $2_2$. If the connection is of high quality, all of the bits within the cipher-data blocks $35_1$ to $35_n$ can be used to calculate the checksum $15_1$, $15_2$, wherein, only the bits for the control data are used to calculate the checksum $15_1$, $15_2$ if the connection is of poor quality.

Figure 6:
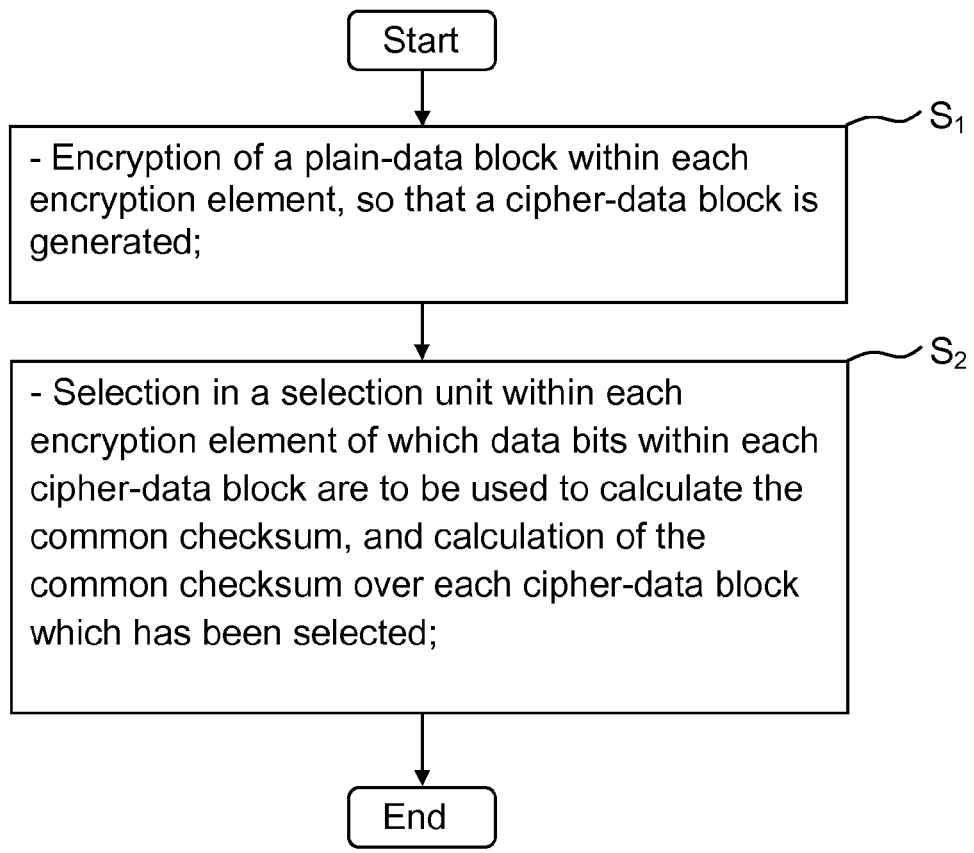
FIG. 6 shows a flow diagram which describes an exemplary embodiment of the method according to the invention with the authentication-decryption unit.

FIG. 6 shows an exemplary embodiment of a flow diagram of the method according to the invention for an authentication-encryption unit 6, which provides at least one encryption element $30_1$ to $30_n$. In a first method step $S_1$, a plain-data block $34_1$ to $34_n$ is encrypted within each encryption element $30_1$ to $30_n$, so that a cipher-data block $35_1$ to $35_n$ is generated from these.

In a second method step $S_2$, a selection unit $52_1$ to $52_n$ in every encryption element $30_1$ to $30_n$ selects which data bits within each cipher-data block $35_1$ to $35_n$ will be used to calculate the common checksum $15_1$. Following this, the common checksum $15_1$ is calculated over every cipher-data block $35_1$ to $35_n$, or respectively over each data bit within the cipher-data block $35_1$ to $35_n$ which has been selected by the selection unit $52_1$ to $52_n$.

Figure 7:
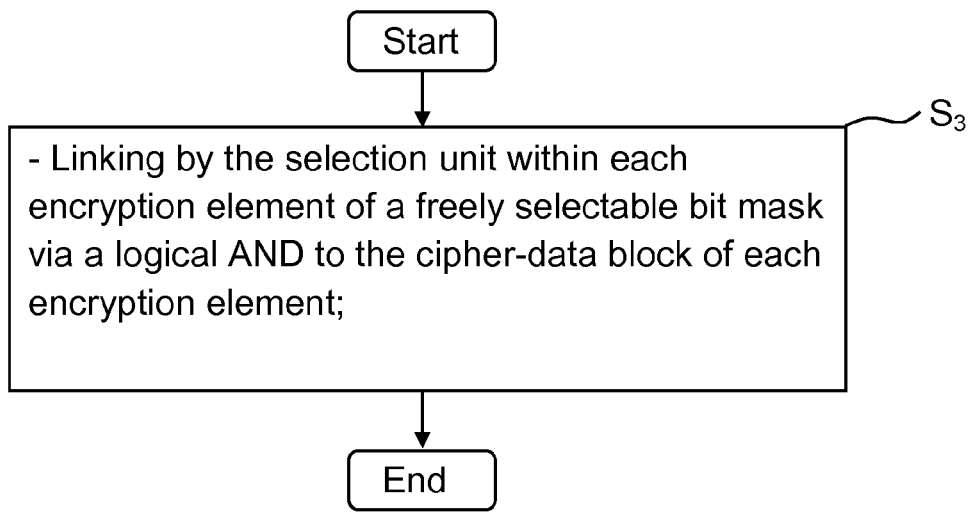
FIG. 7 shows a further flow diagram which describes an exemplary embodiment of the method according to the invention with the authentication-encryption unit or the authentication-decryption unit.

FIG. 7 shows a further exemplary embodiment of a flow diagram of the method according to the invention for an authentication-encryption unit 6, which provides a method step $S_3$, which can be executed after method step $S_2$ of the preceding flow diagram. In the method step $S_3$, a freely selectable bit mask $51_1$ to $51_n$ is linked with the cipher-data block $35_1$ to $35_n$ of each encryption element $30_1$ to $30_n$ via a logical AND $50_1$ to $50_n$ within a selection unit $52_1$ to $52_n$. It is particularly advantageous that such a logical AND link $50_1$ to $50_n$ can be realized very simply in hardware.

Figure 8:
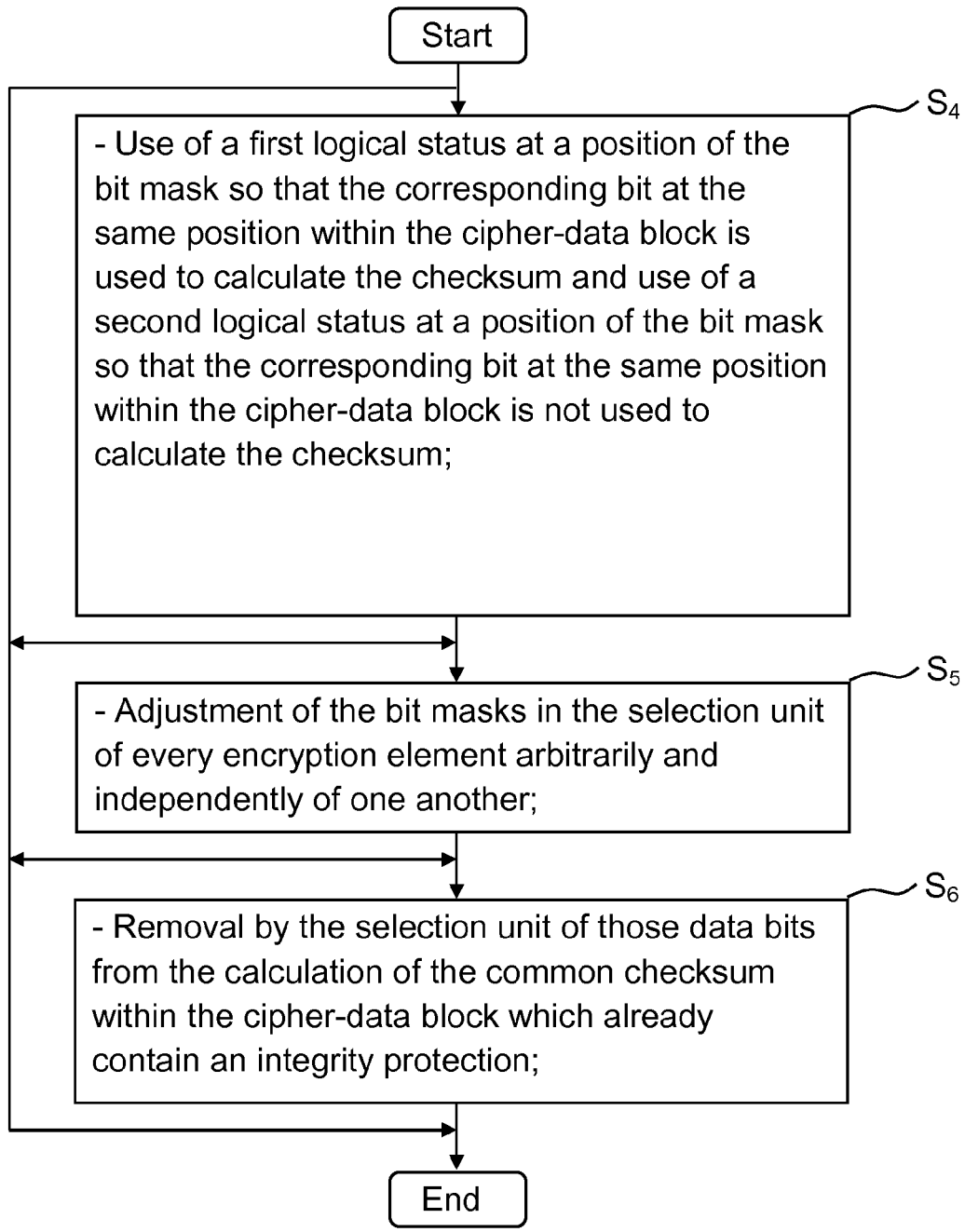
FIG. 8 shows a further flow diagram which describes an exemplary embodiment of the method according to the invention with the authentication-encryption unit or the authentication-decryption unit.

FIG. 8 shows a further exemplary embodiment of a flow diagram of the method according to the invention for an authentication-encryption unit 6. The method step $S_4$ is executed directly after method step $S_3$ and establishes that a first logical status, which can contain a logical "one", is used at a position of the bit mask $51_1$ to $51_n$, so that the corresponding bit at the same position in the cipher-data block $35_1$ to $35_n$ is used to calculate the checksum $15_1$, and that a second logical status, which can contain a logical "zero", is used at a position of the bit mask $51_1$ to $51_n$, so that the corresponding bit at the same position within the cipher-data block $35_1$ to $35_n$ is not used to calculate the checksum $15_1$.

The next method step $S_5$ can also be executed directly after method step $S_3$. Within method step $S_5$, the bit masks $51_1$ to $51_n$ in the selection unit $52_1$ to $52_n$ of each encryption element $30_1$ to $30_n$ can be adjusted arbitrarily and completely independently of one another.

In a further method step $S_6$, which can also be executed directly after one of the method steps $S_2$, $S_3$ or $S_4$, cipher-data blocks $35_1$ to $35_n$, which already contain an integrity protection, are removed from the calculation of the common checksum $15_1$ by the selection unit $52_1$ to $52_n$. This can relate to language data, image data or video data.

Figure 9:
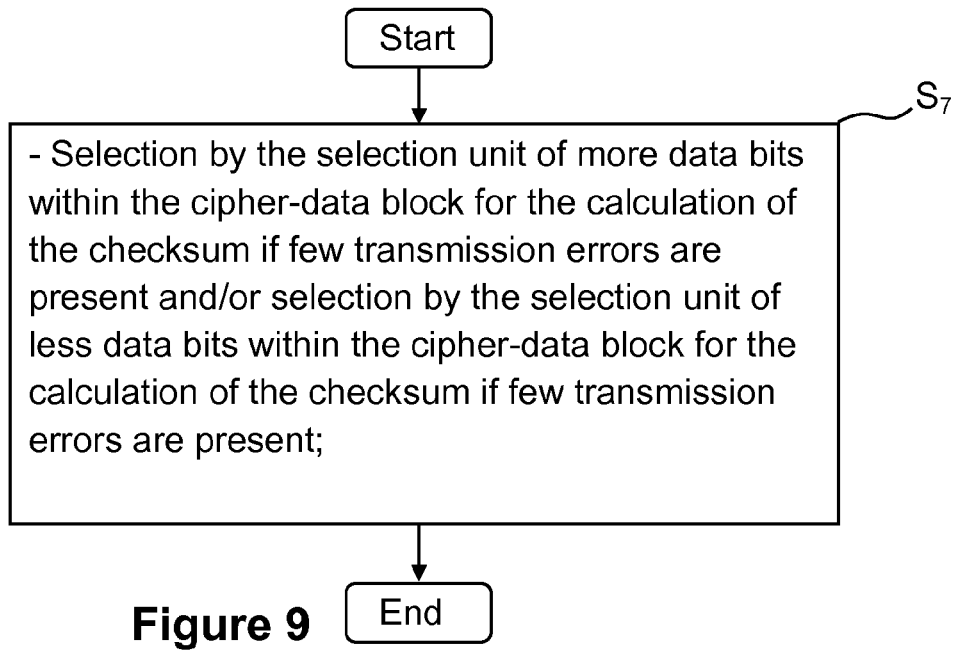
FIG. 9 shows a further flow diagram which describes an exemplary embodiment of the method according to the invention with the authentication-encryption unit or the authentication-decryption unit.

FIG. 9 shows a further exemplary embodiment of a flow diagram of the method according to the invention for an authentication-encryption unit 6 with method step $S_7$ according to the invention. Method step $S_7$ can be executed both after method step $S_2$ and also after method steps $S_3$, $S_4$ or $S_5$. Method step $S_7$ ensures that the bit mask $51_1$ to $51_n$ is matched dynamically to the quality of the transmission channel between the mobile terminal devices $2_1$ and $2_n$. If the transmission channel is subject to low interference, more data bits in the cipher-data block $35_1$ to $35_n$ are used for the calculation of the checksum $15_1$ by the selection unit $52_1$ to $52_n$. Conversely, if the transmission channel is subject to relatively stronger interference, fewer data bits within the cipher-data block $35_1$ to $35_n$ are used for the calculation of the checksum $15_1$ by the selection unit $35_1$ to $35_n$.

Figure 10:
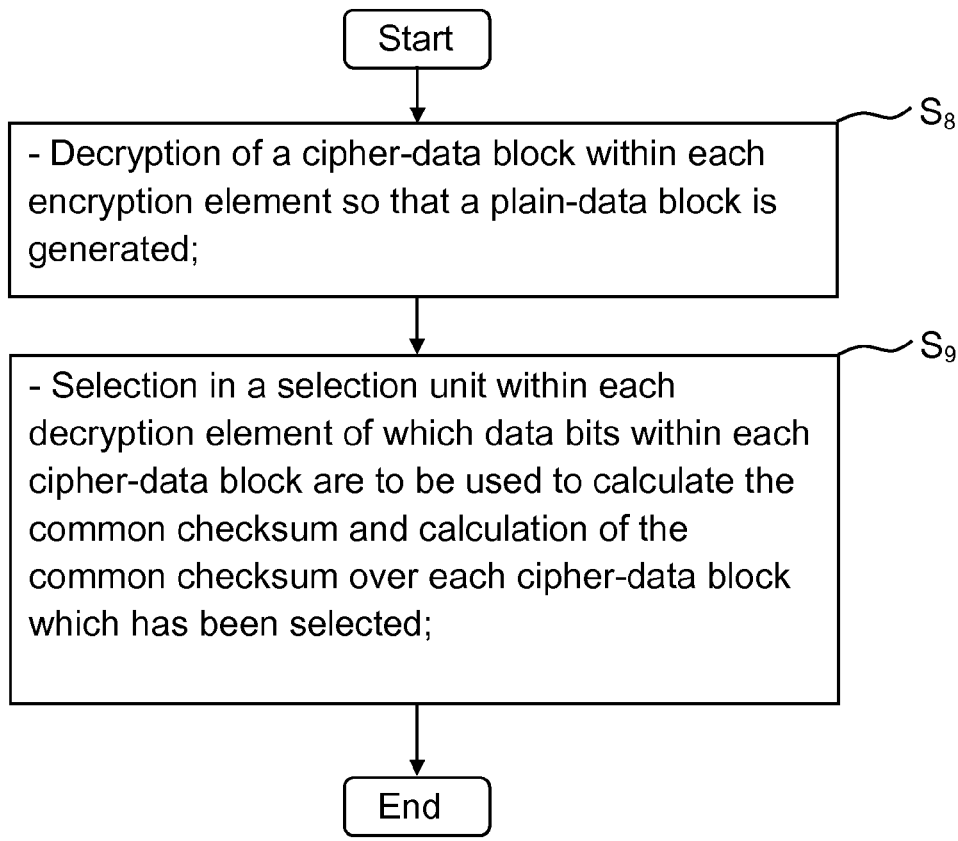
FIG. 10 shows a further flow diagram which describes an exemplary embodiment of the method according to the invention with the authentication-decryption unit.

FIG. 10 shows an exemplary embodiment of a flow diagram for the method according to the invention with an authentication-decryption unit 7, which provides the method steps $S_8$ and $S_9$. In method step $S_8$, a cipher-data block $35_1$ to $35_n$ within each decryption element $29_1$ to $29_n$ is decrypted, so that a plain-data block $34_1$ to $34_n$ is generated respectively from these.

In method step $S_9$, a selection unit $52_1$ to $52_n$ in each decryption element $29_1$ to $29_n$ selects which data bits within each cipher-data block $35_1$ to $35_n$ are used to calculate the common checksum $15_2$. Following this, the common checksum $15_2$ is calculated over every cipher-data block $35_1$ to $35_n$ which has been selected.

In view of the fact that the method for the authentication-decryption unit 7 proceeds in a largely analogous manner to the method for the authentication-encryption unit 6, when they are related to the authentication-decryption unit 7, method steps $S_3$, $S_4$, $S_5$ and $S_7$ can be used together with method steps $S_8$ and $S_9$. Above all, all of the features which relate to an authentication-encryption unit 6 can also be applied to the authentication-decryption unit 7. As already explained, n always relates to a natural number greater than or equal to one.

The method according to the invention for the authentication-encryption unit 6 and the authentication-decryption unit 7 is particularly suitable for implementation in a program which is executed on a computer or a digital signal processor or other electronic computational units. The method for the authentication-encryption unit 6 and for the authentication-decryption unit 7 is also particularly suitable for storage as program code, especially on a machine readable carrier, so that the program can be subsequently executed on a computer or a digital signal processor or other electronic computational units.

Within the framework of the invention, all of the features described and/or illustrated can be combined with one another as required.

The invention claimed is:

1. An authentication-encryption unit which comprises:
   at least one encryption element,
   wherein each encryption element encrypts a plain-data block and accordingly generates a cipher-data block,
   wherein a common checksum is calculated over each cipher-data block,
   wherein it is possible to select via a selection unit in each encryption element which data bits in each cipher-data block are to be used to calculate the common checksum, and
   wherein the data bits in each cipher-data block, which already contains an integrity protection, are removed by the selection unit from calculation of the common checksum.

2. The authentication-encryption unit according to claim 1, wherein the selection unit in each encryption element links a freely selectable bit mask via a logical AND to the cipher-data block of the encryption element.

3. The authentication-encryption unit according to claim 2, wherein a first logical status is set at a position in the bit mask when a corresponding bit is to be used at the same position in the cipher-data block to calculate the common checksum and/or that a second logical status is set at a position in the bit mask when the corresponding bit is not to be used at the same position in the cipher-data block to calculate the common checksum.

4. The authentication-encryption unit according to claim 2, wherein bit masks in the selection unit of each encryption element can be adjusted arbitrarily and independently from one another.

5. The authentication-encryption unit according to claim 1, wherein the data bits in each of the cipher-data blocks, which do not require integrity protection, are removed by the selection unit from the calculation of the common checksum.

6. The authentication-encryption unit according to claim 1, wherein the authentication-encryption unit operates according to a principle of a Galois Counter Mode.

7. The authentication-encryption unit according to claim 1, wherein more data bits in each of the cipher-data blocks are selected via the selection unit to calculate the checksum if a transmission of cipher-data blocks provides few transmission errors, or wherein less data bits in each of the cipher-data blocks are selected via the selection unit to calculate the checksum if the transmission of the cipher-data blocks provides more transmission errors.

8. The authentication-encryption unit according to claim 1, wherein individual encryption elements are connected to one another in such a manner that, after encryption, different cipher-data blocks result even from identical plain-data blocks.

9. The authentication-encryption unit according to claim 8, wherein each encryption element encrypts a different initialization vector with an identical key and links respective plain-data blocks to an encrypted initialization vector with an XOR-link in order to generate the cipher-data blocks.

10. The authentication-encryption unit according to claim 1,
wherein authentication data are multiplied in a multiplication unit by a Galois field vector and linked to output of the selection unit via an XOR-link,
wherein a result is multiplied in a further multiplication unit by a further Galois field vector and always linked via a further XOR-link to an output unit of a next encryption element,
wherein output of a last XOR-link is multiplied in a further multiplication unit by a Galois field vector,
wherein a result from this multiplication unit is linked by an XOR-link to a result of a concatenation made up from a bit length of the authentication data and from a bit length of the cipher-data block,
wherein a result of the XOR-link is multiplied in a further multiplication unit by the Galois field vector, and
wherein a result of this multiplication unit is linked with the XOR-link to an encrypted, unique initialization vector, from which the checksum is calculated.

11. An authentication-decryption unit which comprises:
at least one decryption element, wherein each decryption element decrypts a cipher-data block and accordingly generates a plain-data block,
wherein a common checksum is calculated over each cipher-data block,
wherein it is possible to select via a selection unit in each decryption element which data bits in each cipher-data block are to be used to calculate the common checksum, and
wherein the data bits in each cipher-data block, which already contains an integrity protection, are removed by the selection unit from calculation of the common checksum.

12. The authentication-decryption unit according to claim 11,
wherein a checksum is calculated and compared with a checksum calculated by an authentication-encryption unit.

13. A method for an encryption with an authentication-encryption unit which provides at least one encryption element, comprising:
an encryption of a plain-data block in each encryption element, so that a cipher-data block is generated;
a selection in a selection unit in each encryption element of which data bits are used in each cipher-data block to calculate a common checksum and a calculation of the common checksum over every cipher-data block; and
a removal by the selection unit of those data bits, which already contain an integrity protection, from the calculation of the common checksum in each cipher-data block.

14. The method according to claim 13, further comprising:
a linking by the selection unit in each encryption element of a freely selectable bit mask to the cipher-data block of the encryption element via a logical AND.

15. The method according to claim 14, further comprising:
a use of a first logical status at a position of the bit mask as soon as a corresponding bit is to be used at the same position in the cipher-data block to calculate the common checksum, and
a use of a second logical status at a position of the bit mask as soon as the corresponding bit is not to be used at the same position in the cipher-data block to calculate the common checksum.

16. The method according to claim 14, further comprising:
an adjustment of the bit masks in the selection unit of each encryption element arbitrarily and independently of one another.

17. The method according to claim 13, further comprising:
a removal by the selection unit of those data bits, which do not need an integrity protection, from the calculation of the common checksum in the cipher-data block.

18. The method according to claim 13,
wherein the authentication-encryption unit operates according to a principle of a Galois Counter Mode.

19. The method according claim 13, further comprising:
a selection by the selection unit of more data bits in the cipher-data block to calculate the checksum if a transmission of the cipher-data blocks provides few transmission errors, and/or
a selection by the selection unit of less data bits in the cipher-data block to calculate the checksum if a transmission of the cipher-data blocks provides more transmission errors.

20. The method according to claim 13,
wherein individual encryption elements are connected to one another in such a manner that, after the encryption, different cipher-data blocks result even from identical plain-data blocks.

21. The method according to claim 20, further comprising:
an encryption of a different initialization vector by each encryption element with same keys, and
a linking of respective plain-data blocks with the encrypted initialization vector via an XOR-link in order to generate the cipher-data blocks.

22. The method according to claim 13, further comprising:
a multiplication of authentication data by a Galois field vector in a multiplication unit;
a linking of these data to output of the selection unit via an XOR-link and a multiplication of a result in a further multiplication unit by a further Galois field vector;
a repetition of the preceding step until a link via an XOR-link to the output of the selection unit of a last encryption element is established;
a multiplication of a result in a further multiplication unit by a Galois field vector;
a linking of a result of the latter multiplication unit by an XOR-link to a result of a concatenation made up from a bit length of the authentication data and from a bit length of the cipher-data block;
a multiplication in a further multiplication unit of a result of the XOR-link by the Galois field vector; and
a linking of the result of the latter multiplication unit with the XOR-link to an encrypted, unique initialization vector, thereby calculating the checksum.

23. A method for decryption with an authentication-decryption unit which provides at least one decryption element, comprising:

a decryption of a cipher-data block in each decryption element, so that a plain-data block is generated;

a selection in a selection unit in each decryption element of which data bits are used in each cipher-data block to calculate a common checksum, and a calculation of the common checksum over each cipher-data block; and a removal by the selection unit of those data bits, which already contain an integrity protection, from the calculation of the common checksum in the cipher-data block.

24. The method according to claim 23, further comprising:

a calculation of a checksum, which is compared with a checksum calculated by an authentication-encryption unit.

25. A computer programming method with program-code means for implementation of the following steps:

an encryption of a plain-data block in each encryption element, so that a cipher-data block is generated;

a selection in a selection unit in each encryption element of which data bits are used in each cipher-data block to calculate a common checksum and a calculation of the common checksum over every cipher-data block; and a removal by the selection unit of those data bits, which already contain an integrity protection, from the calculation of the common checksum in each cipher-data block;

when executed on a computer or a digital signal processor or other electronic computational units.

26. A computer program product with program-code means especially stored on a non-transitory machine-readable carrier for implementation of the following steps:

an encryption of a plain-data block in each encryption element, so that a cipher-data block is generated;

a selection in a selection unit in each encryption element of which data bits are used in each cipher-data block to calculate a common checksum and a calculation of the common checksum over every cipher-data block; and a removal by the selection unit of those data bits, which already contain an integrity protection, from the calculation of the common checksum in each cipher-data block;

when executed on a computer or a digital signal processor or other electronic computational units.

* * * * *